US012609330B2

(12) United States Patent
Schotte et al.

(10) Patent No.: US 12,609,330 B2
(45) Date of Patent: Apr. 21, 2026

(54) FUEL CELL STACK AND ELECTROCHEMICAL REACTOR

(71) Applicant: Robert Bosch GmbH, Stuttgart (DE)

(72) Inventors: Jan Schotte, Leonberg (DE); Jan Hendrik Ohs, Renningen (DE); Stefan Klenge, Gerlingen (DE); Volker Gross, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 511 days.

(21) Appl. No.: 18/249,640

(22) PCT Filed: Oct. 14, 2021

(86) PCT No.: PCT/EP2021/078417
§ 371 (c)(1),
(2) Date: Apr. 19, 2023

(87) PCT Pub. No.: WO2022/084136
PCT Pub. Date: Apr. 28, 2022

(65) Prior Publication Data
US 2023/0395823 A1 Dec. 7, 2023

(30) Foreign Application Priority Data

Oct. 20, 2020 (DE) .................... 10 2020 213 218.6

(51) Int. Cl.
*H01M 8/026* (2016.01)
*H01M 8/0254* (2016.01)
(Continued)

(52) U.S. Cl.
CPC ......... *H01M 8/026* (2013.01); *H01M 8/0254* (2013.01); *H01M 8/0267* (2013.01); *H01M 8/1004* (2013.01); *H01M 8/241* (2013.01)

(58) Field of Classification Search
None
See application file for complete search history.

(56) References Cited

U.S. PATENT DOCUMENTS

2005/0017055 A1* 1/2005 Kurz ...................... B32B 15/18
429/510
2017/0141413 A1* 5/2017 Poirot-Crouvezier ......................
H01M 8/026

FOREIGN PATENT DOCUMENTS

DE 102004043513 A1 4/2005
DE 102013206789 A1 10/2013
DE 102013208450 A1 11/2014

OTHER PUBLICATIONS

English language machine translation of DE 102013206789 A1. (Year: 2025).*

(Continued)

*Primary Examiner* — Eli S Mekhlin
(74) *Attorney, Agent, or Firm* — Michael Best & Friedrich LLP

(57) ABSTRACT

The present invention relates to a fuel cell stack (10) for an electrochemical reactor (11), comprising: —a first membrane-electrode assembly (12), a first anode plate (21) having ridges (30), between which ridges channels (31) for conducting fuel (32) and coolant (33) are formed, and —a second anode plate (22) having ridges (30), between which ridges channels (31) for conducting fuel (32) and coolant (33) are formed; wherein the first membrane-electrode assembly (12) is disposed between the first anode plate (21) and the second anode plate (22) in a stacking direction (36) of the fuel cell stack (10) and wherein the ridges (30) each have a ridge outer face (35) spaced apart from the channels (31), and wherein ridge outer faces (35) of the first anode plate (21) and of the second anode plate (22) which face each other are disposed one over the other in the stacking direction (36) in pairs, and ridge outer faces (35) of the first anode plate (21) and the second anode plate (22) which face away from each other are disposed one over the other in the stacking direction (36) in pairs. The invention also relates to (Continued)

a fuel cell system (11) comprising at least one fuel cell stack
(11) according to the invention.

9 Claims, 3 Drawing Sheets

(51)  Int. Cl.
    *H01M 8/0267*      (2016.01)
    *H01M 8/1004*      (2016.01)
    *H01M 8/241*       (2016.01)

(56)                References Cited

OTHER PUBLICATIONS

Translation of International Search Report for Application No.
PCT/EP2021/078417 dated Feb. 14, 2022 (2 pages).

* cited by examiner

FUEL CELL STACK AND ELECTROCHEMICAL REACTOR

BACKGROUND

The present invention relates to a fuel cell stack for an electrochemical reactor, comprising a first membrane-electrode assembly, a first anode plate with ridges between which channels for conducting fuel and coolant are formed, and a second anode plate with ridges between which channels for conducting fuel and coolant are formed, wherein the first membrane-electrode assembly is arranged in a stacking direction of the fuel cell stack between the first anode plate and the second anode plate, and wherein the ridges each have a ridge outer face spaced apart from the channels. The invention also relates to an electrochemical reactor with a fuel cell stack.

Electrochemical reactors in the form of fuel cell systems are known in the prior art. Fuel cell systems are electrochemical energy converters in which hydrogen and oxygen are converted into water, electrical energy and heat. In order to increase the performance of a fuel cell system, repeating units, in particular in the form of a stacked structure with a membrane-electrode assembly (MEA) and bipolar plates, are stacked multiple times in a fuel cell stack of the fuel cell system. The electrochemical reactions take place within the membrane-electrode assemblies. The bipolar plates ensure that the three media of fuel, air, and coolant are evenly distributed over and conducted to the membrane-electrode assembly.

There are different structural approaches with regard to the stack structure of a fuel cell stack. First, a so-called channel/land or channel/ridge structure is known. In such a system, shown in FIG. 5, a bipolar plate consists of two corrugated metal plates, from which three channels or channel types are formed, through which the three process fluids hydrogen, air and coolant are conducted. Two adjacent bipolar plates with a membrane-electrode arrangement in between are always arranged in such a way that ridges are positioned adjacent to ridges and channels adjacent to channels, or positioned adjacently via the membrane-electrode assembly. Furthermore, a structure with an open-porous gas diffuser on the respective cathode side of the membrane-electrode assembly is known. Such a structure, shown in FIG. 6, also uses corrugated metal plates to conduct hydrogen and coolant. However, these are not arranged directly next to each other, but are separated from each other by a flat separator plate and an open-porous gas diffuser, through which the air is conducted, and the MEA. This means that in such an embodiment variant, the corrugated cathode plate is replaced by a separator plate and an open-porous gas diffuser. With this system, there is a risk that the ridges of an anode-side metal plate will press on the membrane-electrode assembly, while the membrane-electrode assembly rests on the open-porous structure with an underside. If the pressure is now laterally dissipated through the anode-side plate within the porous structure to the next ridge of a cathode-side plate, there is a risk that the thin separator plate will buckle and thus reduce the cross-section of a coolant channel underneath. This leads to increased pressure loss and consequently to a reduced coolant volume flow in the fuel cell stack. In addition, the pressure can cause the membrane-electrode assembly to bulge into the hydrogen channel and make it smaller, which can result in a correspondingly reduced hydrogen volume flow during operation of the fuel cell system.

SUMMARY

Within the scope of the present invention, a fuel cell stack and an electrochemical reactor with an improved stack structure with regard to the stability of the fuel cell stack are now made available. In particular, a fuel cell stack and an electrochemical reactor are proposed. Features that are described in connection with the fuel cell stack naturally also apply in connection with the reactor according to the invention and vice versa, so that reference is and/or can always be made reciprocally with regard to the disclosure regarding the individual aspects of the invention.

According to a first aspect of the present invention, a fuel cell stack for an electrochemical reactor is provided. The fuel cell stack includes a first membrane-electrode assembly, a first anode plate comprising ridges between which channels are formed for conducting fuel and coolant, and a second anode plate comprising ridges between which channels are formed for conducting fuel and coolant. The first membrane-electrode assembly is arranged between the first anode plate and the second anode plate in a stacking direction of the fuel cell stack. The ridges each have a ridge outer face spaced apart from the channels. Ridge outer faces of the first anode plate and the second anode plate that are facing each other are arranged in pairs one above the other as viewed along the stacking direction, and ridge outer faces of the first anode plate and the second anode plate that face away from each other are arranged in pairs one above the other along the stacking direction.

In comparison to known fuel cell stacks with a gas diffusion layer and/or a corresponding open-porous oxygen distribution structure, every second anode plate, in particular a corrugated anode plate, is accordingly offset by half a wavelength in a direction perpendicular to the stacking direction. Based on the arrangement and design of the anode plates according to the invention, the first membrane-electrode assembly that is arranged between the first anode plate and the second anode plate and a gas diffuser that is also arranged between the first anode plate and the second anode plate or a corresponding open-porous oxygen distributor structure of two ridges or the two ridges facing each other are pressed together without causing the membrane-electrode assembly and/or the gas diffuser to dissipate forces laterally in relation to the stacking direction. The resulting advantageous flow of force means that bulging of a separator plate arranged between the second anode plate and the gas diffuser into the coolant channel can be prevented. In addition, the bulging of the membrane-electrode assembly into a fuel channel as described above can be prevented. In this context, an anode plate does not refer to a part of the anode electrode of the membrane-electrode assembly, but a fluid guide plate, which is designed in particular as a component of a bipolar plate, on the anode side of the respective fuel cell.

The fact that the ridge outer faces of the first anode plate and the second anode plate that face each other are arranged in pairs one above the other along the stacking direction can be understood to mean that a ridge outer face of the first anode plate, which faces a ridge outer face of the second anode plate and/or is directed towards this, is positioned in the stacking direction, respectively above or below the second ridge outer face. The positioning of the ridge outer faces one above the other is to be understood in particular as a positioning directly above each other and/or at least partly in alignment one above the other. In particular, the respective end sections of the ridge outer sides facing each other and/or the ridge outer sides facing away from each other can be positioned so that they are aligned along the stacking direction. Directly one above the other, however, should not mean that the two ridge outer faces touch each other. Rather, the membrane-electrode assembly, the gas diffuser and the separator plate are arranged in between. A ridge outer face is to be understood in particular as a side surface of the respective ridge, which does not face into the associated channel, but faces away from it. Thus, a ridge outer face of the anode plate can be understood to mean a respective anode plate contact side, which is in contact with the separator plate or an anode electrode in each case. Consequently, each anode plate can have separator plate ridge outer faces which are in contact with the respective separator plate, and anode electrode ridge outer faces, which are in contact with the respective anode electrode. The stacking direction can be understood to mean a direction along a y-axis through the fuel cell stack. In this case, the stacking direction and/or the y-axis extend in particular along or parallel to a normal vector of the ridge outer faces. The same applies analogously to the ridge outer faces of the first anode plate and the second anode plate which face away from each other and are arranged in pairs over each other, i.e. in particular directly over each other and/or at least partially in alignment with each other, when viewed along the stacking direction.

Preferably, the ridge outer faces each have a planar or substantially planar surface. It can be understood that the ridges, spaced apart from the channels, have a ridge outer face in that the outer faces of the ridge are not formed and/or positioned to form the channel structure and/or the channel geometry. The fact that the first membrane-electrode assembly is arranged in a stacking direction of the fuel cell stack between the first anode plate and the second anode plate is not to be considered as a limitation in that only the first membrane-electrode assembly is arranged in a stacking direction of the fuel cell stack between the first anode plate and the second anode plate. Rather, when viewed in the stacking direction of the fuel cell stack, other functional components such as a separator plate and a type-appropriate gas diffuser can be positioned between the first anode plate and the second anode plate in addition to the membrane-electrode assembly.

In a fuel cell stack according to the invention, at least some of the ridges of the first anode plate can be arranged on the first anode electrode and/or at least some of the ridges of the second anode plate can be arranged on the second anode electrode. In particular, the fact that an anode plate has ridges between which channels are formed to conduct fuel and coolant should be understood to mean that an anode plate has ridges between which channels to conduct fuel are formed and, spaced at an interval from these, channels to conduct coolant are formed.

The fuel cell stack is particularly formed for use in a fuel cell system, but can also be used in an electrolyzer and/or a reversibly operable fuel cell system.

According to a further embodiment of the present invention, the stacking direction of a fuel cell stack can correspond to a y-axis and the second anode plate can be arranged so that it is rotated by 180° about the y-axis in relation to the first anode plate. When viewed separately from the fuel cell stack, the first anode plate and the second anode plate can therefore be identically formed. This results in low production costs. An outer or edge-positioned channel of the first anode plate can herein be formed and designed to conduct the coolant, and another outer or edge-positioned channel of the first anode plate can be formed and designed to conduct the fuel. Moreover, a channel positioned at the edge of the second anode plate can be formed and designed to conduct the coolant, and another channel positioned at the edge of the second anode plate can be formed and designed to conduct the fuel. The outer or edge-positioned channel refers in particular to the last and/or outermost channel of the respective anode plate.

Moreover, in a fuel cell stack according to the present invention, the stacking direction can correspond to a y-axis, and the second anode plate can be arranged so that it is rotated by 180° about a respective x-axis in relation to the first anode plate. The x-axis is perpendicular to the y-axis or the stacking direction, and is also perpendicular or parallel to a channel or ridge direction. Again, the first anode plate and the second anode plate, when considered separately from the fuel cell stack, can be identically designed and correspondingly inexpensively manufactured. According to this design variant, the outer channels of the first anode plate can be formed and designed to conduct the coolant, and the outer channels of the second anode plate can be formed and designed to conduct the fuel. In order to prevent damage to the fuel cell stack and/or a reduction in the performance of the fuel cell stack, the outer channels of the anode plate which does not conduct the coolant in the outer channels can be formed and designed as empty channels for conducting and/or guiding ambient air.

Moreover, in a fuel cell stack according to the present invention, the first anode plate and the second anode plate can each have a wave-shaped cross-section, and the channels can each have a trapezoidal or substantially trapezoidal cross-section. In the present case, a trapezoidal or substantially trapezoidal cross-section is to be understood in particular as a trapezoidal cross-section which does not have sharp corners, but slightly rounded corners, where applicable for production reasons. The trapezoidal shape permits the provision of sufficiently large ridge outer faces to ensure the desired stability in the fuel cell stack, while also providing the channel structures. The anode plates can have a uniform wave and/or trapezoidal shape with correspondingly consistent wave-shaped and/or trapezoidal segments. However, it can also be advantageous if the anode plates each form uniform channels for conducting fuel and uniform channels for conducting coolant, wherein the channels for conducting fuel have a different cross section than the channels for conducting coolant. According to embodiment design variant of the present invention, it is therefore possible for channels intended to conduct fuel to be arranged along the stacking direction and, when viewed in a cross-section of the fuel cell stack, to be respectively arranged above channels intended to conduct coolant.

Moreover, a fuel cell stack according to the present invention can include a second membrane-electrode assembly having a second anode electrode and a second cathode electrode, a first gas diffuser for conducting air through the fuel cell stack, a second gas diffuser for conducting air through the fuel cell stack, a first separator plate, and a second separator plate, wherein the first membrane-electrode assembly comprises a first anode electrode and a first cathode electrode, the first anode plate is arranged between the first separator plate and the first anode electrode, the second anode plate is arranged between the second separator plate and the second anode electrode, and the second gas diffuser is arranged between the first cathode electrode and the second separator plate. The separator plates provide galvanic isolation in the fuel cell stack and at the same time, contribute to stability in the fuel cell stack. The separator plates can each have a thickness in a range between 75 μm and 100 μm. Moreover, in such an embodiment, it is possible for the ridge outer faces of the first anode plate that are arranged on the first anode electrode and the ridge outer faces of the second anode plate that are arranged on the second separator plate to face each other. Furthermore, the ridge outer faces of the first anode plate that are arranged on the first separator plate and the ridge outer faces of the second anode plate that are arranged on the second anode electrode can face away from each other.

A fuel cell stack according to the invention can also include a third membrane-electrode assembly having a third anode electrode and a third cathode electrode, a third anode plate having ridges between which channels are formed to conduct fuel and coolant, a third gas diffuser for conducting air through the fuel cell stack, and a third separator plate, wherein the third anode plate is arranged between the third separator plate and the third anode electrode, the third gas diffuser is arranged between the second cathode electrode and the third separator plate, and wherein ridge outer faces of the second anode plate, which are arranged on the second anode electrode, and ridge outer faces of the third anode plate, which are arranged on the third separator plate, face each other, and/or ridge outer faces of the second anode plate that are arranged on the second separator plate, and ridge outer faces of the third anode plate that are arranged on the third anode electrode and face away from each other.

According to a further aspect of the present invention, an electrochemical reactor comprising a fuel cell stack as described above is provided. Thus, the reactor according to the invention offers the same advantages that have been described in detail with reference to the fuel cell stack according to the invention.

Further measures for improving the invention arise from the following description of various embodiment examples of the invention, which are schematically illustrated in the drawings. All of the features and/or advantages arising from the claims, description, or drawings, including structural details and spatial arrangements, can be essential to the invention, both by themselves and in the various combinations.

BRIEF DESCRIPTION OF THE DRAWINGS

Schematically, the figures show.

Elements having the same function and mode of action are each provided with the same reference numbers in the figures.

DETAILED DESCRIPTION

Figure 1:
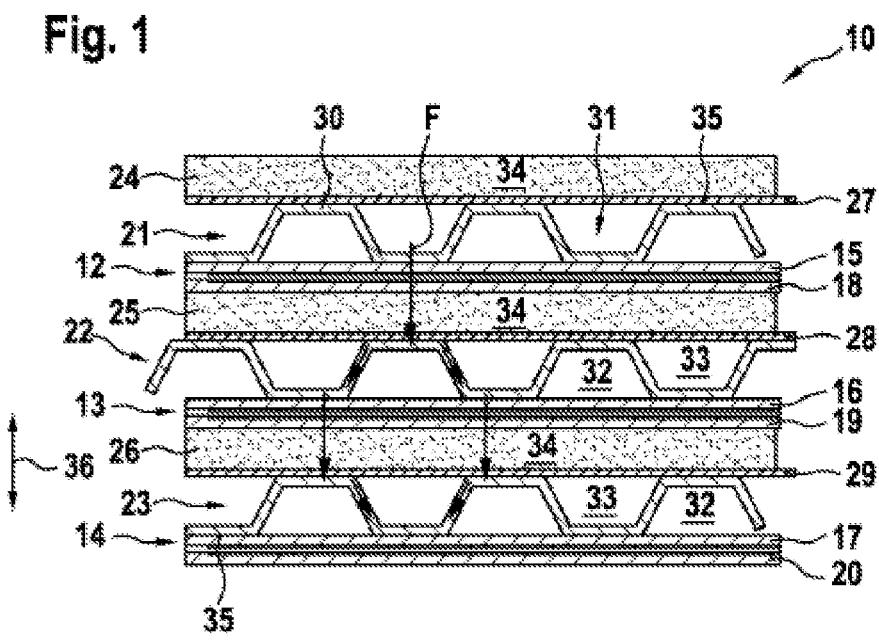
FIG. 1 a fuel cell stack according to a first embodiment of the present invention, FIG. 2 a first anode electrode and a rotated second anode electrode according to a first embodiment variant, FIG. 3 a first anode electrode and a rotated second anode electrode according to a second embodiment variant, FIG. 4 an electrochemical reactor with a fuel cell system according to the invention, FIG. 5 a fuel cell stack known in the prior art, and FIG. 6 a further fuel cell stack known in the prior art.
Figure 4:
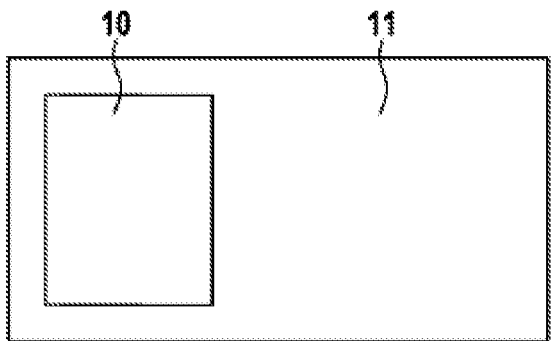

FIG. 1 shows a cut-out of a fuel cell stack 10 for an electrochemical reactor 11 shown in FIG. 4 according to a preferred embodiment. The fuel cell stack 10 comprises a first membrane-electrode assembly 12 having a first anode electrode 15 and a first cathode electrode 18, a second membrane-electrode assembly 13 having a second anode electrode 16 and a second cathode electrode 19, and a third membrane-electrode assembly 14 having a third anode electrode 17 and a third cathode electrode 20. Moreover, the fuel cell stack 10 comprises a first anode plate 21 having ridges 30, between which channels 31 are formed to conduct fuel 32 and coolant 33, a second anode plate 22 having ridges 30, between which channels 31 are formed to conduct fuel 32 and coolant 33, and a third anode plate 23 having ridges 30, between which channels 31 are formed to conduct fuel 32 and coolant 33. In addition, the fuel cell stack 10 for conducting air 34 through the fuel cell stack 10 comprises a first gas diffuser 24, a second gas diffuser 25, and a third gas diffuser 26. The gas diffusers 24, 25, 26 are each formed as open-porous gas diffuser layers. Moreover, the fuel cell stack comprises a first separator plate 27, a second separator plate 28, and a third separator plate 29.

The first membrane-electrode assembly 12 is arranged between the first anode plate 21 and the second gas diffuser 25 as viewed in a stacking direction 36 of the fuel cell stack 10. The second membrane-electrode assembly 13 is arranged between the second anode plate 22 and the third gas diffuser 26. The third membrane-electrode assembly 14 is arranged between the third anode plate 23 and a further gas diffuser not shown. The first anode plate 21 is arranged between the first separator plate 27 and the first anode electrode 15. The second anode plate 22 is arranged between the second separator plate 28 and the second anode electrode 16. The third anode plate 23 is arranged between the third separator plate 29 and the third anode electrode 17. The first gas diffuser 24 is arranged between a cathode electrode not shown and the first separator plate 27. The second gas diffuser 25 is arranged between the first cathode electrode 18 and the second separator plate 28. The third gas diffuser 26 is arranged between the second cathode electrode 19 and the third separator plate 29.

The ridges 30 respectively have one ridge outer face 35, spaced apart from the channels 31 or outside the channels 31. According to the illustrated embodiment, the ridge outer faces 35 of the first anode plate 21 and the second anode plate 22 that face each other are arranged in pairs, respectively over each other, along the stacking direction 36 or along a normal vector of the ridge outer faces 35. In addition, ridge outer faces 35 of the first anode plate 21 and the second anode plate 22 that face each other as viewed along the stacking direction 36 are arranged in pairs over each other. Moreover, ridge outer faces 35 of the second anode plate 22 that are arranged on the second anode electrode 16 and ridge outer faces 35 of the third anode plate 23 that are arranged on the third separator plate 29 face each other. Ridge outer faces 35 of the second anode plate 22 that are arranged on the second separator plate 28 and ridge outer faces 35 of the third anode plate 23 that are arranged on the third anode electrode 17 face away from each other. Ridge outer faces 35 of the first anode plate 21 that are arranged on the first anode electrode 15 and ridge outer faces 35 of the second anode plate 22 that are arranged on the second separator plate 28 face each other. Ridge outer faces 35 of the first anode plate 21 that are arranged on the first separator plate 27 and ridge outer faces 35 of the second anode plate 22 that are arranged on the second anode electrode 16 face away from each other. The layer structure shown results in a flow of force F which can be effectively dissipated by the anode plates 21, 22, 23 to prevent bulging of the separator plates 27, 28, 29. As can be seen in FIG. 1, pairs of ridge outer faces 35 that face each other respectively have two adjacent ridge outer faces 35 of two other pairs of ridge outer faces 35 that face away from each other, and vice versa.

According to the illustrated embodiment, the depicted anode plates 21, 22, 23 each have a corrugated cross-section, and the channels 31 each have a trapezoidal cross-section. The channels 31 for conducting fuel 32 are arranged along the stacking direction 36 and, as viewed in a cross-section of the fuel cell stack 10, are each arranged via channels 31 for conducting coolant 33.

Figure 2:
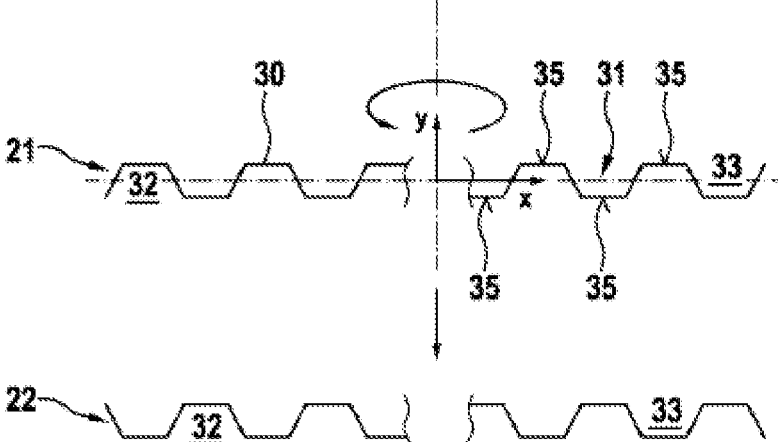

Referring to FIG. 2, a design variant of an anode plate that can be used with different positioning in the fuel cell stack 10 from the first anode plate 21, the second anode plate 22, and further anode plates of further stack layers is described below. At the top of FIG. 2, the anode plate is shown as the first anode plate 21. If the same plate is now rotated by 180° about the y-axis or about an axis along the stacking direction 36, the anode plate can be used as the second anode plate 22. As shown in FIG. 2, the first anode plate 21 is formed and designed to conduct fuel 32 through the left outer channel 31 and to conduct coolant 33 through the right outer channel 31. The rotated second anode plate 22 is formed and designed to conduct fuel 32 through the right outer channel 31 and conduct coolant 33 through the left outer channel 31.

Figure 3:
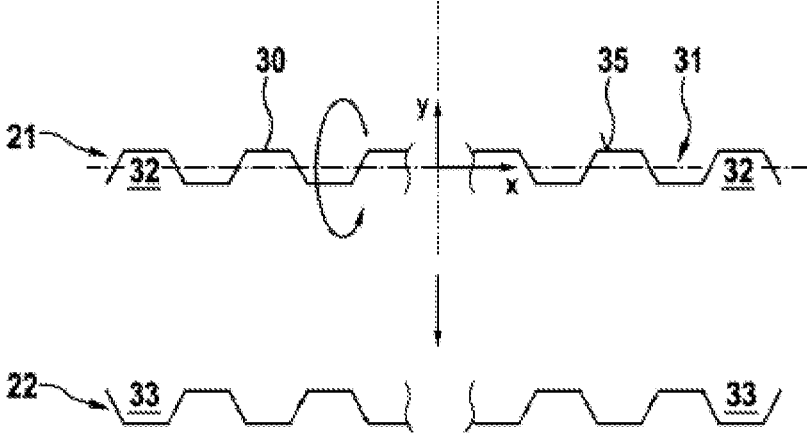

Referring to FIG. 3, a further design variant of an anode plate that can be used with different positioning in the fuel cell stack 10 than the first anode plate 21, the second anode plate 22, and further anode plates of further stack layers is described. At the top of FIG. 3, the anode plate is shown as the first anode plate 21. If the same plate is now rotated 180° around an x-axis that is perpendicular to the y-axis, the anode plate can be used as the second anode plate 22. As shown in FIG. 3, the first anode plate 21 is formed and designed to conduct fuel 32 through the left outer channel 31 and through the right outer channel 31. The rotated second anode plate 22 is formed and designed to conduct coolant 33 through the right outer channel 31 and the left outer channel 31.

Figure 5:
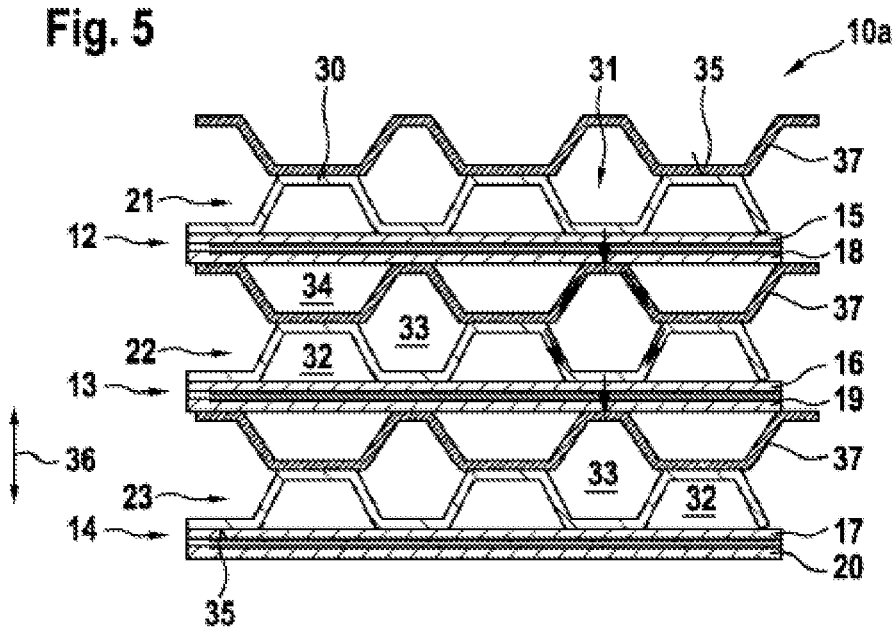
Figure 6:
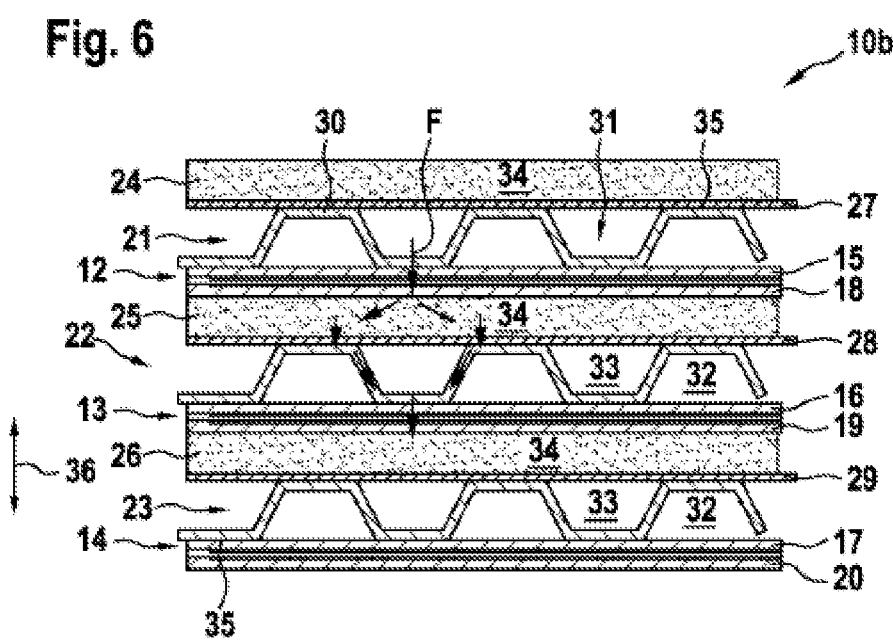

FIGS. 5 and 6 show the fuel cell stacks 10a, 10b already described at the beginning and known in the prior art. In the embodiment shown in FIG. 5, air 34 is conducted in a channel structure of a cathode plate 37. The invention allows for further design principles in addition to the illustrated embodiments. That is to say, the invention is not intended to be limited to the embodiment examples explained with reference to the figures.

The invention claimed is:

1. A fuel cell stack (10) for an electrochemical reactor (11), comprising:
   a first membrane-electrode assembly (12),
   a first anode plate (21) having ridges (30) between which channels (31) are formed for conducting fuel (32) and coolant (33), and
   a second anode plate (22) having ridges (30) between which channels (31) are formed for conducting fuel (32) and coolant (33),
   a second membrane-electrode assembly (13) having a second anode electrode (16) and a second cathode electrode (19),
   a first gas diffuser (24) for conducting air (34) through the fuel cell stack (10),
   a second gas diffuser (25) for conducting air (34) through the fuel cell stack (10),
   a first separator plate (27), and
   a second separator plate (28),
   wherein
   the first membrane-electrode assembly (12) is arranged in a stacking direction (36) of the fuel cell stack (10) between the first anode plate (21) and the second anode plate (22), and
   wherein the ridges (30) each have a ridge outer face (35) that is spaced apart from the channels (31),

8 wherein
the first membrane-electrode assembly (12) comprises a first anode electrode (15) and a first cathode electrode (18), the first anode plate (21) is arranged between the first separator plate (27) and the first anode electrode (15), the second anode plate (22) is arranged between the second separator plate (28) and the second anode electrode (16), and the second gas diffuser (25) is arranged between the first cathode electrode (18) and the second separator plate (28), and
wherein
the ridge outer faces (35) of the first anode plate (21) and the second anode plate (22) which face towards each other are arranged in pairs along the stacking direction (36) above each other, and the ridge outer faces (35) of the first anode plate (21) and the second anode plate (22) that face away from each other are arranged in pairs along the stacking direction (36) above each other.

2. The fuel cell stack (10) according to claim 1,
wherein
the stacking direction (36) corresponds to a y-axis and the second anode plate (22) is arranged so that it is rotated by 180° about the y-axis in relation to the first anode plate (21).

3. The fuel cell stack (10) according to claim 1,
wherein
the stacking direction (36) corresponds to a y-axis and the second anode plate (22) is arranged so that it is rotated by 180° about an associated x-axis in relation to the first anode plate (21).

4. The fuel cell stack (10) according to claim 1,
wherein
the first anode plate (21) and the second anode plate (22) each have a wave-shaped cross-section, and the channels (31) each have a trapezoidal cross-section.

5. The fuel cell stack (10) according to claim 1,
wherein
channels (31) for conducting fuel (32) are arranged along the stacking direction (36) and when viewed in relation to a cross-section of the fuel cell stack (10), are each arranged over channels (31) for conducting coolant (33).

6. The fuel cell stack (10) according to claim 1,
wherein
ridge outer faces (35) of the first anode plate (21) that are arranged on the first anode electrode (15) and ridge outer faces (35) of the second anode plate (22) that are arranged on the second separator plate (28) face towards each other.

7. The fuel cell stack (10) according to claim 1,
wherein
ridge outer faces (35) of the first anode plate (21) that are arranged on the first separator plate (27) and ridge outer faces (35) of the second anode plate (22) that are arranged on the second anode electrode (16) face away from each other.

8. The fuel cell stack (10) according to claim 1,
wherein
a third membrane-electrode assembly (14) having a third anode electrode (17) and a third cathode electrode (20),
a third anode plate (23) having ridges (30) between which channels (31) are formed for conducting fuel (32) and coolant (33),
a third gas diffuser (26) for conducting air (19) through the fuel cell stack (10), and
a third separator plate (29), wherein the third anode plate (23) is arranged between the third separator plate (29) and the third anode electrode (17), the third gas diffuser (26) is arranged between the second cathode electrode (19) and the third separator plate (29), and wherein ridge outer faces (35) of the second anode plate (22) that are arranged on the second anode electrode (16) and ridge outer faces (35) of the third anode plate (23) that are arranged on the third separator plate (29) face each other, and/or ridge outer faces (35) of the second anode plate (22) that are arranged on the second separator plate (28) and ridge outer faces (35) of the third anode plate (23) that are arranged on the third anode electrode (17) face away from each other.

9. An electrochemical reactor (11) having a fuel cell stack (10) according to claim 1.

* * * * *